(12) United States Patent
Wang et al.

(10) Patent No.: US 9,954,991 B2
(45) Date of Patent: Apr. 24, 2018

(54) STATUS NOTIFICATION METHOD AND DEVICE

(71) Applicant: Xiaomi Inc., Beijing (CN)

(72) Inventors: Yang Wang, Beijing (CN); Qiang Fu, Beijing (CN); Hao Chen, Beijing (CN)

(73) Assignee: Xiaomi Inc., Beijing (CN)

( * ) Notice: Subject to any disclaimer, the term of this patent is extended or adjusted under 35 U.S.C. 154(b) by 56 days.

(21) Appl. No.: 14/954,548

(22) Filed: Nov. 30, 2015

(65) Prior Publication Data

US 2016/0189522 A1    Jun. 30, 2016

Related U.S. Application Data

(63) Continuation of application No. PCT/CN2015/080804, filed on Jun. 4, 2015.

(30) Foreign Application Priority Data

Dec. 31, 2014 (CN) .......................... 2014 1 0852609

(51) Int. Cl.
*H04M 1/725* (2006.01)
*G08B 21/24* (2006.01)
*F24F 11/00* (2018.01)

(52) U.S. Cl.
CPC ....... *H04M 1/72522* (2013.01); *F24F 11/006* (2013.01); *G08B 21/245* (2013.01); *F24F 2011/0047* (2013.01)

(58) Field of Classification Search
CPC ............... H04M 1/72522; F24F 11/006; F24F 2011/0047; G08B 21/245; G06F 1/3206; G06F 1/3212; G06F 1/3287; Y02B 60/1282; Y02B 60/50

See application file for complete search history.

(56) References Cited

U.S. PATENT DOCUMENTS

| 6,400,113 B1 | 6/2002 | Garcia et al. |
| 8,103,557 B2 | 1/2012 | Hanai et al. |
| 8,532,002 B1 | 9/2013 | Zats et al. |

(Continued)

FOREIGN PATENT DOCUMENTS

| CN | 1847825 A | 10/2006 |
| CN | 101074966 A | 11/2007 |

(Continued)

OTHER PUBLICATIONS

Extended European Search Report of European Patent Application No. 15185316.5, from the European Patent Office, dated Jan. 20, 2016.

(Continued)

*Primary Examiner* — Orlando Bousono
(74) *Attorney, Agent, or Firm* — Finnegan, Henderson, Farabow, Garrett & Dunner LLP

(57) ABSTRACT

A status notification method for use in a terminal, includes: acquiring usage information of a target apparatus, the usage information including at least each usage duration of the target apparatus; calculating current consumption of the target apparatus according to the usage information of the target apparatus; and generating an alert regarding a current status of the target apparatus after the current consumption of the target apparatus reaches a preset consumption alerting threshold.

18 Claims, 8 Drawing Sheets

(56) References Cited

U.S. PATENT DOCUMENTS

| | | | |
|---|---|---|---|
| 2003/0139976 A1 | 7/2003 | Hanai et al. | |
| 2007/0043950 A1* | 2/2007 | Imanishi | G06F 21/10 713/176 |
| 2008/0133956 A1* | 6/2008 | Fadell | G06F 1/3203 713/340 |
| 2011/0231586 A1* | 9/2011 | Komano | G06F 3/1203 710/18 |
| 2012/0233480 A1* | 9/2012 | Tanaka | G06F 1/3203 713/320 |
| 2013/0067263 A1* | 3/2013 | Liu | H04W 52/0225 713/340 |
| 2014/0062707 A1* | 3/2014 | Hong | H04Q 9/00 340/657 |
| 2014/0068314 A1 | 3/2014 | Kim et al. | |
| 2014/0095091 A1* | 4/2014 | Moore | H04Q 9/00 702/63 |
| 2014/0222230 A1* | 8/2014 | Shimizu | G05B 13/02 700/291 |
| 2015/0076926 A1* | 3/2015 | Kosaka | H02J 3/14 307/126 |
| 2015/0077126 A1* | 3/2015 | Wang | H01M 10/44 324/428 |
| 2015/0077127 A1* | 3/2015 | Fu | G06F 1/3212 324/428 |
| 2015/0189594 A1* | 7/2015 | Liang | H04W 52/0225 455/574 |
| 2016/0042049 A1* | 2/2016 | Shilts | G06F 17/30592 707/603 |
| 2016/0042368 A1* | 2/2016 | Sloss | G06Q 30/0202 705/7.31 |

FOREIGN PATENT DOCUMENTS

| | | |
|---|---|---|
| CN | 101158631 A | 4/2008 |
| CN | 102098177 A | 6/2011 |
| CN | 102505970 A | 6/2012 |
| CN | 104636134 A | 5/2015 |
| JP | H8-124067 A | 5/1996 |
| JP | H11-271407 A | 10/1999 |
| JP | 3274574 B2 | 4/2002 |
| JP | 2003-288532 A | 10/2003 |
| JP | 2008-20536 A | 1/2008 |
| JP | 2009-211300 A | 9/2009 |
| JP | 2010-132051 A | 6/2010 |

OTHER PUBLICATIONS

Office Action for Russian Application No. 2015138593/11(059247), dated Oct. 20, 2016.

* cited by examiner

STATUS NOTIFICATION METHOD AND DEVICE

CROSS-REFERENCE TO RELATED APPLICATIONS

This application is a continuation of International Application No. PCT/CN2015/080804, filed Jun. 4, 2015, which is based on and claims priority to Chinese Patent Application No. 201410852609.1, filed Dec. 31, 2014, the entire contents of all of which are incorporated herein by reference.

TECHNICAL FIELD

The present disclosure generally relates to the field of information technology and, more particularly, to a status notification method and device.

BACKGROUND

As air pollution is becoming an increasingly serious problem, air purifiers have been widely used to improve air quality at living places. The purifying effect of an air purifier is generally determined by a filter, which is a core element of the air purifier. With the accumulation of usage duration, the filter is depleted gradually. However, due to lack of awareness about the status of the filter, users often fail to replace the filter timely. This may eventually make the air purifier fail to operate properly, and thus unable to effectively purify the air. Therefore, to establish a better living environment, it is necessary to provide alert about the current status of the filter, so as to keep the air purifier in a normal operating condition.

SUMMARY

According to a first aspect of the present disclosure, there is provided a status notification method for use in a terminal, comprising: acquiring usage information of a target apparatus, the usage information including at least each usage duration of the target apparatus; calculating current consumption of the target apparatus according to the usage information of the target apparatus; and generating an alert regarding a current status of the target apparatus after the current consumption of the target apparatus reaches a preset consumption alerting threshold.

According to a second aspect of the present disclosure, there is provided a device for providing status notification, comprising: a processor; and a memory for storing instructions executable by the processor; wherein the processor is configured to perform: acquiring usage information of a target apparatus, the usage information comprising at least each usage duration of the target apparatus; calculating current consumption of the target apparatus according to the usage information of the target apparatus; and generating an alert regarding a current status of the target apparatus after the current consumption of the target apparatus reaches a preset consumption alerting threshold.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of devices and methods consistent with aspects related to the invention as recited in the appended claims.

Figure 1:
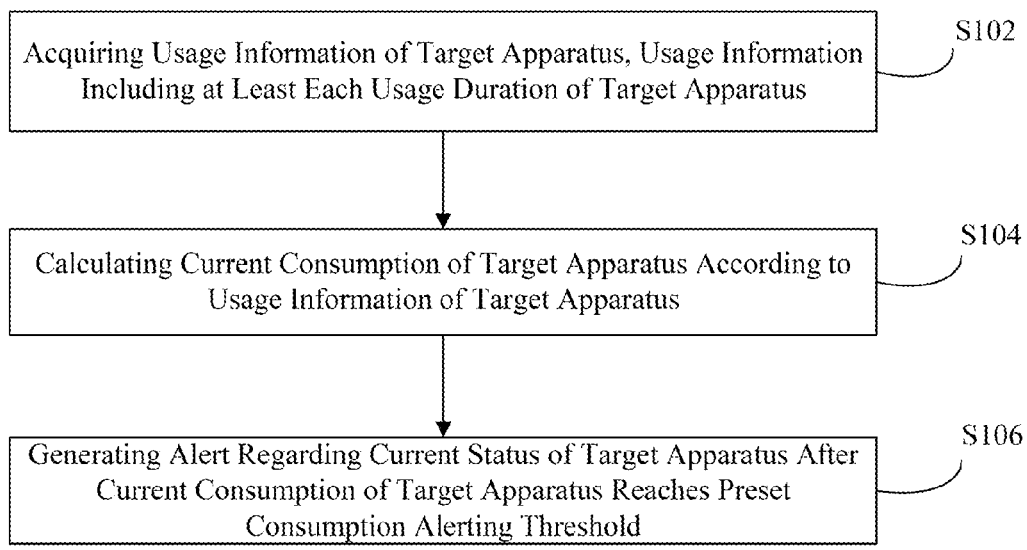
FIG. 1 is a flowchart of a status notification method, according to an exemplary embodiment.

FIG. 1 is a flowchart of a status notification method 100, according to an exemplary embodiment. For example, the method 100 may be used in a terminal. Referring to FIG. 1, the method 100 includes the following steps.

In step 102, the terminal acquires usage information of a target apparatus. The usage information includes at least each usage duration of the target apparatus.

In step 104, the terminal calculates current consumption of the target apparatus according to the usage information.

In step 106, the terminal generates an alert regarding a current status of the target apparatus after the current consumption of the target apparatus reaches a preset consumption alerting threshold.

The method 100 calculates the current consumption of the target apparatus according to the usage information, which is generally more accurate than a user's own experience. Moreover, the method 100 alerts the user timely when the consumption reaches the preset consumption alerting threshold. Therefore, the target apparatus may be constantly kept in a normal working condition.

Figure 2:
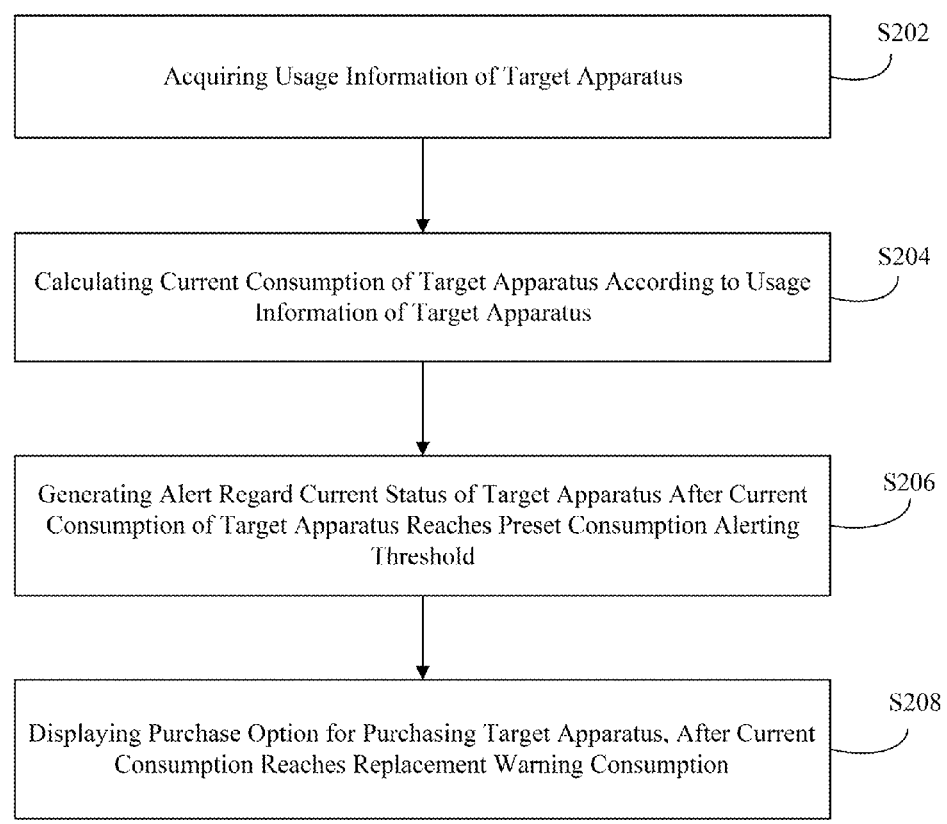
FIG. 2 is a flowchart of a status notification method, according to an exemplary embodiment.

FIG. 2 is a flowchart of a status notification method 200, according to an exemplary embodiment. For example, the method 200 may be used in a terminal for providing a status notification regarding a target apparatus. The terminal may be a mobile phone, a tablet computer, and the like. The target apparatus may be an air purifier. However, the present disclosure is not limited to the terminal or target apparatus. Referring to FIG. 2, the method 200 includes the following steps.

In step S202, the terminal acquires usage information of a target apparatus.

In exemplary embodiments, the process of acquiring the usage information varies depending on particular functions of each terminal and target apparatus. In one embodiment, the target apparatus may have a recording function for automatically recording a number of times that the target apparatus has been used, a duration of each usage, and an operating level of the target apparatus during each usage. The terminal may have an inquiring function for inquiring air quality over the cloud to acquire the corresponding environmental data.

In another embodiment, the target apparatus may have a monitoring function for automatically monitoring the air quality during each usage, acquiring environmental data indicative of the air quality, and sending the acquired environmental data to the terminal. The terminal may have a storage function for storing the environmental data received from the target apparatus.

In yet another embodiment, the target apparatus may have a storing function for storing the acquired environmental data in a storage unit, such as a memory or a flash memory. The terminal may have a data acquisition function for acquiring usage information of the target apparatus from the same. The usage information includes, e.g., at least the duration of each usage of the target apparatus.

In exemplary embodiments, both the terminal and the target apparatus may establish communication between each other and/or with other equipment via a radio frequency or network. For example, the terminal may activate a Bluetooth function to establish a Bluetooth connection with the target apparatus, and to acquire the usage information of the target apparatus via the Bluetooth connection. Also for example, the terminal may activate a near field communication (NFC) function to establish a NFC data channel with the target apparatus, and to acquire the usage information of the target apparatus via the NFC data channels. For yet another example, the terminal may establish a local area network (LAN) with the target apparatus through a router, and receive the usage information of the target apparatus forwarded by the router in the LAN. In addition to the manners described above, any other manners known in the art may be utilized by the terminal to acquire the usage information of the target apparatus.

In step S204, the terminal calculates current consumption of the target apparatus according to the usage information of the target apparatus.

The usage information can accurately indicate an actual usage condition of the target apparatus, so the terminal may calculate the current consumption of the target apparatus according to the usage information of the target apparatus. The current consumption of the target apparatus serves as an important basis for performing status notification of the target apparatus and thus prevents the target apparatus from failing to work normally due to excessive consumption. This way, a better user experience with the living place may be improved.

The terminal may calculate the current consumption of the target apparatus according to the following three steps.

In the first step, the terminal may acquire each usage duration of the target apparatus from the usage information of the target apparatus. Each usage duration may start from a first point in time when the target apparatus is turned on and last until a second point in time when the target apparatus is subsequently turned off.

In the second step, the terminal may obtain a theoretical cumulative usage duration of the target apparatus by adding each acquired usage duration of the target apparatus. For example, the theoretical cumulative usage duration is obtained without considering other external factors of the target apparatus.

For example, a process of obtaining the theoretical cumulative usage duration of the target apparatus may be illustrated using Table 1.

TABLE 1

| Usage | Usage Duration (Hour(s)) |
|---|---|
| 1 | 3 |
| 2 | 8 |
| 3 | 4.5 |
| 4 | 5.5 |
| 5 | 10 |
| 6 | 13 |
| 7 | 5 |
| 8 | 2 |
| 9 | 3 |
| 10 | 7 |

Based on the information in Table 1, the terminal may obtain the theoretical cumulative usage duration of the target apparatus by adding the acquired 10 usage durations of the target apparatus, i.e., 3+8+4.5+5.5+10+13+5+2+3+7=62 hours.

In the third step, the terminal may calculate the current consumption of the target apparatus according to the theoretical cumulative usage duration of the target apparatus and a lifespan of the target apparatus.

The lifespan may reflect the performance of the target apparatus, and may be an average value obtained by a manufacturer of the target apparatus through multiple tests. For example, the lifespan of a target apparatus may be 3000 hours, 5000 hours, or the like. After obtaining the theoretical cumulative usage duration of the target apparatus, the terminal may obtain a ratio of the theoretical cumulative usage duration to the lifespan by dividing the theoretical cumulative usage duration with the lifespan. This ratio is the current consumption of the target apparatus.

For example, the lifespan of the target apparatus may be 5000 hours. If the theoretical cumulative usage duration obtained by the terminal is 3000 hours, the current consumption of the target apparatus=the theoretical cumulative usage duration of the target apparatus/the lifespan of the target apparatus=3000/5000=60%. That is, the current consumption of the target apparatus is 60%.

In actual application, the current consumption of the target apparatus may depend on various factors, such as operating environment of the target apparatus, operating level of the target apparatus, operating area of the target apparatus, and the like. Considering these factors, the terminal may calculate the current consumption of the target apparatus according to one or more of the following three embodiments.

Embodiment 1: Considering Working Environment of Target Apparatus

In a first embodiment, the terminal considers the operating environment of the target apparatus to calculate the current consumption of the target apparatus. The consumption of the target apparatus may vary as the target apparatus operates in different environments. For example, when operating in an environment with good air quality, the target apparatus may have a low consumption. However, when working in an environment with poor air quality, the target apparatus may have a high consumption. Moreover, in the present embodiment, different environments may correspond to different environmental data, so as to enable the weighing of the effects of different environments on the consumption of the target apparatus. For example, the environmental data may include particle matter concentration, pollutant concentration, and the like.

In the present embodiment, the environmental data may be stored in a cloud or in the terminal. Accordingly, the terminal may acquire the environmental data from the cloud, or directly from a storage unit of the terminal.

The terminal may use the environmental data to more accurately calculate the current consumption of the target apparatus, using the following steps 1.1-1.3.

In step 1.1, the terminal determines an environmentally weighted value for each usage duration, according to the environmental data corresponding to each usage duration.

The environment around the location of the target apparatus may be monitored in long term. Multiple types of environmental data representative of the location may be obtained for characterizing the environment. The environmental data may be given an environmentally weighted value, according to environmental quality indicated by the environmental data. Specifically, environmental data representative of a good environmental quality may be given a small environmentally weighted value, while environmental data representative of a poor environmental quality may be given a large environmentally weighted value. Thus, a corresponding relationship may be formed between each type of environmental data and an environmentally weighted value. In the present embodiment, once determined, the corresponding relationship may be stored for future use. For example, the terminal may store the corresponding relationship either locally or in the cloud.

The terminal may determine the environmentally weighted values based on the corresponding relationship between the environmental data and the environmentally weighted values. For example, after obtaining the environmental data corresponding to each usage duration of the target apparatus, the terminal may look up the corresponding relationship to determine the corresponding environmentally weighted value.

In step 1.2, the terminal obtains an actual cumulative usage duration of the target apparatus by adding products of each usage duration and the corresponding environmentally weighted value.

For example, a process of obtaining the actual cumulative usage duration of the target apparatus, based on each usage duration and the corresponding environmentally weighted value of the target apparatus, may be illustrated using Table 2.

TABLE 2

| Usage | Usage Duration (Hour(s)) | Environmentally Weighted Value |
|---|---|---|
| 1 | 5 | 3 |
| 2 | 3 | 2 |
| 3 | 7 | 4 |
| 4 | 2.5 | 2 |
| 5 | 4 | 3 |

Based on the data shown in Table 2, the actual cumulative usage duration of the target apparatus=5*3+3*2+7*4+2.5*2+4*3=66 hours.

In step 1.3, the terminal calculates the current consumption of the target apparatus according to the actual cumulative usage duration of the target apparatus and a lifespan of the target apparatus.

After obtaining the actual cumulative usage duration of the target apparatus (step 1.2), the terminal may further obtain the current consumption of the target apparatus by calculating a ratio of the actual cumulative usage duration to the lifespan.

For example, the lifespan of the target apparatus may be 5000 hours. If the actual cumulative usage duration of the target apparatus, determined based on each usage duration and the corresponding environmentally weighted value of the target apparatus, is 1000 hours, the current consumption of the target apparatus=the actual cumulative usage duration of the target apparatus/the lifespan of the target apparatus=1000/5000=20%. That is, the current consumption of the target apparatus is 20%.

Embodiment 2: Considering Operating Level of Target Apparatus

In a second embodiment, the terminal considers operating levels of the target apparatus to calculate the current consumption of the target apparatus. The operating levels may include a regular level, a powerful level, a hibernate level, and the like. The target apparatus may have different consumptions at different operating levels. For example, the target apparatus may bear a small consumption, a large consumption, and a minimum consumption, when operating at the regular level, the powerful level, and the hibernate level, respectively.

The operating levels may be stored either in the target apparatus or in the terminal. When the operating levels are stored in the target apparatus, the terminal may acquire the operating levels from the target apparatus by means of Bluetooth, NFC or the like. When the operating levels are stored in the terminal, the terminal may acquire the operating levels directly from its own storage unit.

The terminal may use the acquired operating levels to more accurately calculate the current consumption of the target apparatus, using the following steps 2.1-2.3.

In step 2.1, the terminal determines a level weighted value for each usage duration, according to the operating level of the target apparatus within each usage duration.

The terminal may set different level weighted values for different operating levels of the target apparatus. Specifically, the terminal may set a maximum level weighted value for the powerful level, a minimum level weighted value for the hibernate level, and a level weighted value between the maximum and minimum level weighted values for the regular level. For example, a level weighted value 5 may be set for the powerful level, a level weighted value 3 may be set for the regular level, and a level weighted value 1 may be set for the hibernate level. Thus, there may be a corresponding relationship formed between the operating levels and the level weighted values. The corresponding relationship may be stored for future use. For example, the corresponding relation may be stored either locally in the terminal or remotely in the cloud.

The terminal may determine the level weighted values based on the corresponding relationship between the operating levels and the level weighted values. For example, after obtaining the operating level corresponding to each usage duration of the target apparatus, the terminal may look up the corresponding relationship to determine the corresponding level weighted value.

In step 2.2, the terminal obtains an actual cumulative usage duration of the target apparatus by adding products of each usage duration and the corresponding level weighted value of the target apparatus.

For example, a process of obtaining the actual cumulative usage duration of the target apparatus, based on each usage duration and the corresponding level weighted value, may be illustrated using Table 3.

TABLE 3

| Usage | Usage Duration (Hour(s)) | Level Weighted Value |
|---|---|---|
| 1 | 5 | 3 |
| 2 | 3 | 1 |
| 3 | 7 | 2 |
| 4 | 2.5 | 2 |
| 5 | 4 | 1 |

Based on the data shown in Table 3, the actual cumulative usage duration of the target apparatus=5*3+3*1+7*2+2.5*2+4*1=41 hours.

In step 2.3, the terminal calculates the current consumption of the target apparatus according to the actual cumulative usage duration of the target apparatus and the lifespan of the target apparatus.

After obtaining the actual cumulative usage duration of the target apparatus, the terminal may obtain the current consumption of the target apparatus by calculating a ratio of the actual cumulative usage duration to the lifespan.

For example, the lifespan of the target apparatus may be 5000 hours. If the actual cumulative usage duration of the target apparatus, determined based on each usage duration and the corresponding level weighted value of the target apparatus, is 4000 hours, the current consumption of the target apparatus=the actual cumulative usage duration of the target apparatus/the lifespan of the target apparatus=4000/5000=80%. That is, the current consumption of the target apparatus is 80%.

Embodiment 3: Considering Operating Area of Target Apparatus

In a third embodiment, the terminal considers the operating areas of the target apparatus to calculate the current consumption of the target apparatus. For example, if the target apparatus is an air purifier, the working area may be a purifying area of the air purifier, such as 20 $m^2$, 30 $m^2$, 50 $m^2$, or the like. Consumption of the target apparatus may vary as the target apparatus operate with different operating areas. The consumption of the target apparatus may be high for large operating area, while low for a small operating area.

The working areas may be stored either in the target apparatus or in the terminal. When the operating areas are stored in the target apparatus, the terminal may acquire the operating areas from the target apparatus by means of Bluetooth, NFC, or the like. When the operating areas are stored in the terminal, the terminal may acquire the operating areas directly from its own storage unit.

The terminal may use the acquired operating areas to more accurately calculate the current consumption of the target apparatus, using the following steps 3.1-3.3.

In step 3.1, the terminal determines an area weighted value for each usage duration, according to the operating area of the target apparatus within each usage duration.

The terminal may set different area weighted values for different operating areas. Specifically, the terminal may set the area weighted values proportional to the operating areas. For example, the terminal may set an area weighted value 1 for a working area of 20 $m^2$, an area weighted value 3 for a working area of 50 $m^2$, an area weighted value 5 for a working area of 100 $m^2$, and the like. Moreover, a corresponding relationship between the operating areas and the area weighted values may be stored for future use. For example, the corresponding relationship may be stored locally in the terminal or remotely in the cloud.

The terminal may determine the area weighted values based on the corresponding relationship between the operating areas and the area weighted values. For example, after obtaining the operating area corresponding to each usage duration of the target apparatus, the terminal may look up the corresponding relationship to determine the corresponding area weighted value.

In step 3.2, the terminal obtains an actual cumulative usage duration of the target apparatus by adding products of each usage duration and the corresponding area weighted value of the target apparatus.

For example, a process of obtaining the actual cumulative usage duration of the target apparatus, based on each usage duration and the corresponding area weighted value of the target apparatus, may be illustrated using Table 4.

TABLE 4

| Usage | Usage Duration (Hour(s)) | Area Weighted Value |
|---|---|---|
| 1 | 5 | 1 |
| 2 | 3 | 2 |
| 3 | 7 | 2 |
| 4 | 2.5 | 2 |
| 5 | 4 | 1 |

Based on the data shown in Table 4, the actual cumulative usage duration of the target apparatus=5*1+3*2+7*2+2.5*2+4*1=34 hours.

In step 3.3, the terminal calculates the current consumption of the target apparatus according to the actual cumulative usage duration of the target apparatus and the lifespan of the target apparatus.

After obtaining the actual cumulative usage duration of the target apparatus, the terminal may further obtain the current consumption of the target apparatus by calculating a ratio of the actual cumulative usage duration to the lifespan.

For example, the lifespan of the target apparatus may be 5000 hours. If the actual cumulative usage duration of the target apparatus, determined based on each usage duration and the corresponding area weighted values of the target apparatus, is 3000 hours, the current consumption of the target apparatus=the actual cumulative usage duration of the target apparatus/the lifespan of the target apparatus=3000/5000=60%. That is, the current consumption of the target apparatus is 60%.

Each of the above-described three embodiments is directed to determine the current consumption of the target apparatus subjected to one factor. However, the target apparatus may be subjected to multiple factors at the same time during operation. That is, the consumption of the target apparatus may be affected by at least two of the above-described factors. In these situations, when the terminal calculates the current consumption of the target apparatus, the terminal may obtain the actual cumulative usage duration of the target apparatus by adding products of each usage duration and each of the corresponding weighted values of the target apparatus. Further, the terminal may calculate the current consumption of the target apparatus according to the actual cumulative usage duration of the target apparatus and a lifespan of the target apparatus.

An example of the above process is illustrated using Table 5.

TABLE 5

| Usage | Usage Duration (Hour(s)) | Environmentally Weighted Value | Area Weighted Value |
|---|---|---|---|
| 1 | 5 | 3 | 1 |
| 2 | 3 | 2 | 2 |
| 3 | 7 | 4 | 2 |

TABLE 5-continued

| Usage | Usage Duration (Hour(s)) | Environmentally Weighted Value | Area Weighted Value |
|---|---|---|---|
| 4 | 2.5 | 2 | 2 |
| 5 | 4 | 3 | 1 |

Based on the usage information of the target apparatus shown in Table 5, the actual cumulative usage duration of the target apparatus=5*3*1+3*2*2+7*4*2+2.5*2*2+4*3*1=105 hours. If the lifespan of the target apparatus is 200 hours, the current consumption of the target apparatus=105/200=52.5%. That is, the current consumption of the target apparatus is 52.5%.

It is contemplated that the above-described calculations using the weighted values serve only as examples. Other methods based on the weighted values may also be used to current consumption of the target apparatus.

In step 206, the terminal generates an alert regarding a current status of the target apparatus after the current consumption of the target apparatus reaches a preset consumption alerting threshold.

The preset consumption alerting threshold may a critical point of the consumption of the target apparatus. The preset consumption alerting threshold may be obtained through experiments conducted on the target apparatus. To enable user-friendly alerting, the preset consumption alerting threshold may include multiple thresholds, such as a first threshold, a second threshold, a third threshold, and the like. For example, the first threshold may be lower than the second threshold, and the second threshold may be lower than the third threshold. The consumption of the target apparatus corresponding to the first threshold may be relatively low, such as 12%, 10%, or the like. The consumption of the target apparatus corresponding to the second threshold may be relatively high, such as 30%, 20%, or the like. The consumption of the target apparatus corresponding to the third threshold may be relatively high, such as 60%, 50%, or the like.

After calculating the current consumption of the target apparatus, the terminal may display a data display page on a display interface of the terminal. The data display page may be configured to display the current consumption of the target apparatus. To achieve high efficiency of alerting efficiency, the terminal may display the data display page when the operating level of the target apparatus changes, or when the target apparatus is turned on or off.

By generating the alert after the current consumption of the target apparatus reaches the preset consumption alerting threshold, the terminal can provide timely notification about the current status of the target apparatus, and prevent the target apparatus from failing to operate properly. If the preset consumption alerting threshold includes the above-described first, second, and third threshold, the terminal may use the following three manners to provide the alert regarding the current status of the target apparatus.

Figure 3:
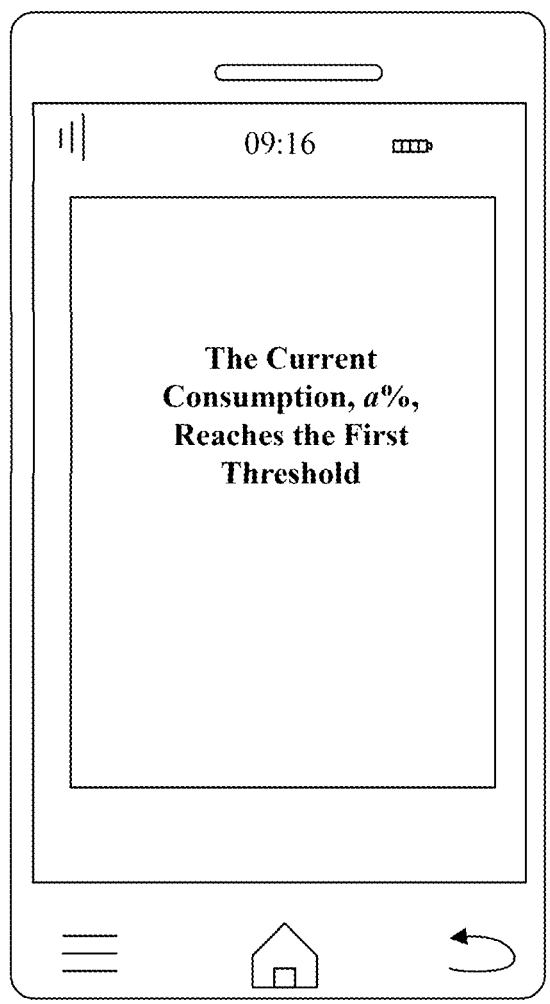
FIG. 3 is a schematic diagram showing a display interface of a terminal, according to an exemplary embodiment.

The first manner may be used when the current consumption of the target apparatus reaches the first threshold. The first threshold is relatively small and indicates that the target apparatus can still operate normally for a relatively long period. Accordingly, the first manner may be a regular alerting manner for providing low level alert, such as changing display colors or using bold fonts on the data display page. FIG. 3 is a schematic diagram showing an exemplary display interface of a terminal. Referring to FIG. 3, the first threshold may be set as a %. After the current consumption of the target apparatus reaches a %, the terminal may use bold font in a data display page to display "The current consumption, a %, reaches the first threshold."

Figure 4:
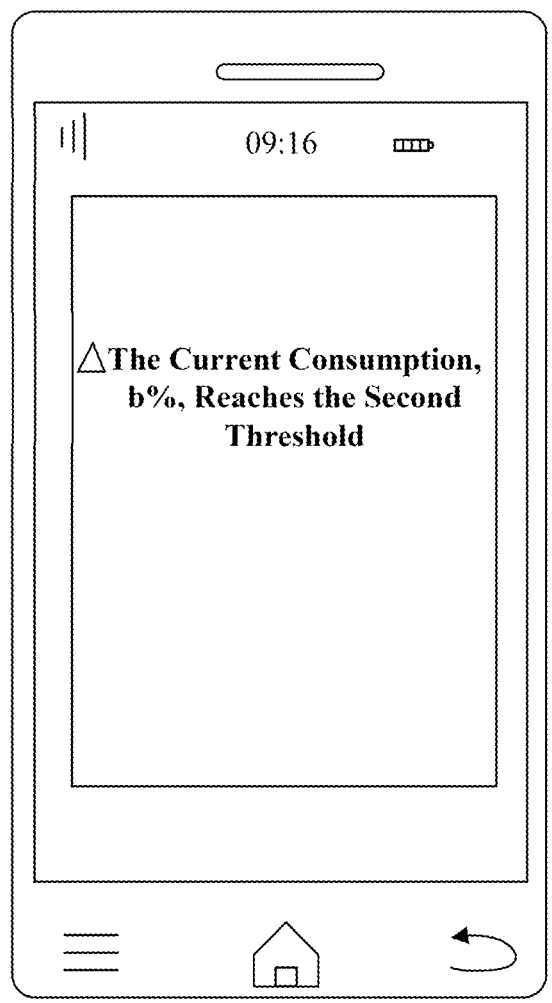
FIG. 4 is a schematic diagram showing a display interface of a terminal, according to an exemplary embodiment.

The second manner may be used when the current consumption of the target apparatus reaches the second threshold. The second threshold is relatively large and indicates that the target apparatus can operate normally for a relatively short period. Accordingly, the second alerting manner may combine a regular alerting manner with an alerting mark to provide medium level alert. For example, the second manner may combine the changing of display colors with an appended alerting mark, or combine bold font with an appended alerting mark. The alerting mark may include a check mark, a triangle, and the like. FIG. 4 is a schematic diagram showing an exemplary display interface of a terminal. Referring to FIG. 4, the second threshold may be set as b %. After the current consumption of the target apparatus reaches b %, the terminal may use bold font on a data display page, together with an appended triangle as the alerting mark, to display "The current consumption, a %, reaches the first threshold."

Figure 5:
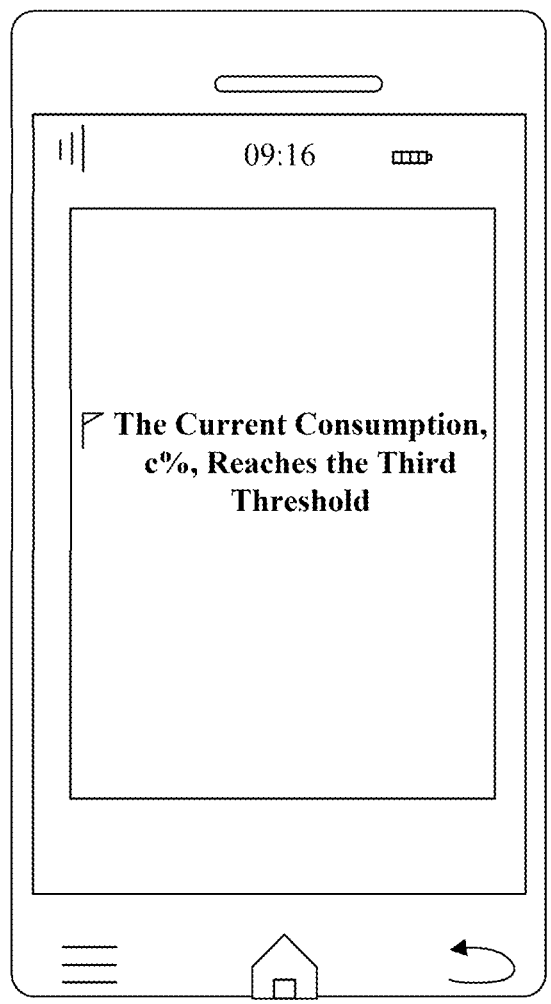
FIG. 5 is a schematic diagram showing a display interface of a terminal, according to an exemplary embodiment.

The third manner may be used when the current consumption of the target apparatus reaches the third threshold. The third threshold is relatively high and indicates that the target apparatus is about to reach its lifespan. Accordingly, the third alerting manner may roll an emergency alerting mark on the data display page to provide high level alert. The emergency alerting mark may include an exclamation mark, a flag mark, and the like. FIG. 5 is a schematic diagram showing an exemplary display interface of a terminal. Referring to FIG. 5, the second threshold may be set as c %. After the current consumption of the target apparatus reaches c %, the terminal may display on the data display page a rolling flag and the text of "The current consumption, c %, reaches the third threshold."

In step 208, the terminal displays a purchase option for purchasing the target apparatus, after the current consumption of the target apparatus reaches a replacement warning consumption.

For example, a purchase option shortcut directs to a purchase link of the target apparatus. When detecting that the shortcut is selected, the terminal may switch the currently displayed data display page to the purchase link, so that the user can purchase the target apparatus.

The replacement warning consumption may be a minimum consumption at which the target apparatus can operate properly. If the user fails to replace the target apparatus timely after the replacement warning consumption is reached, the target apparatus would fail to operate properly. In view of the importance of the replacement warning consumption, the terminal may determine the replacement warning consumption according to the following manner.

First, the terminal acquires purchase history of a user account. When a user does online shopping, the shopping information may be recorded in the user account, including, but not limited to, time of purchase, items purchased, a seller's warehouse address, and the user's shipping address. These types of information constitute the purchase history. Using a keyword of the target apparatus, such as an apparatus name, the terminal may look up the numerous purchase histories contained in the user account to retrieve the purchase history associated with the target apparatus.

Second, the terminal determines the replacement warning consumption according to the current consumption of the target apparatus, the usage information of the target apparatus, and the purchase history of the user account. The terminal may perform this determination according to the following three steps.

In the first step, the terminal determines remaining useful days of the target apparatus according to the usage information and the current consumption of the target apparatus. The usage information may include each usage duration and the number of usages of the target apparatus. The terminal may determine a usage frequency based on the number of usages, and determine a usage intensity based on the usage duration. The terminal may further determine a daily consumption of the target apparatus according to the usage frequency and the usage intensity. Finally, the terminal may determine the remaining useful days based on the current consumption and the daily consumption of the target apparatus. In addition to the above-described method, in some embodiments, the terminal may also preset the remaining useful days. For example, the terminal may set the remaining useful days as 6 days, 8 days, and the like.

In the second step, the terminal determines a delivery time for the target apparatus according to the seller's warehouse address and the user's shipping address. Both addresses may be obtained from the purchase history of the user account. Based on both addresses and the past delivery record, the terminal may determine the delivery time. In addition to this method, the terminal may also use a preset delivery time for the target apparatus. For example, the preset delivery time may be may be 3 days, 5 days, and the like.

In the third step, the terminal determines the replacement warning consumption of the target apparatus, according to the remaining useful days and the delivery time. The terminal may first determine the daily consumption during the remaining useful days. Then, assuming that the target apparatus can operate properly, the terminal may determine the replacement warning consumption based on the delivery time of the target apparatus. For example, if the remaining useful days are 7 and the current consumption of the target apparatus is 79%, then the daily consumption of the target apparatus is 3%. If the delivery time of the terminal apparatus is determined to be 3 days, then the combined consumption of the target apparatus within these 3 days may be 9%. To ensure the target apparatus to operate properly, the terminal may determine the replacement warning consumption to be 9%.

Figure 6:
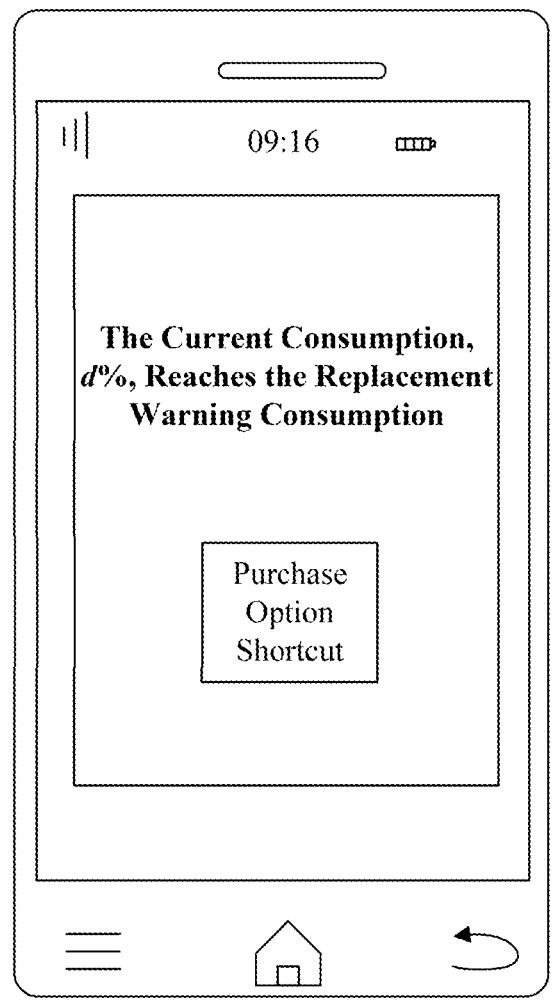
FIG. 6 is a schematic diagram showing a display interface of a terminal, according to an exemplary embodiment.

FIG. 6 is a schematic diagram illustrating the implementation of step 208. Referring to FIG. 6, the terminal determines the target apparatus's replacement warning consumption is d %, according to the current consumption, the usage information, and the purchase history of the user account. After the current consumption of the target apparatus reaches d %, the terminal may display the purchase option shortcut on the data display page. Further, after detecting that the shortcut purchase option is selected, the terminal may switch the data display page to a purchase link of the target apparatus, for the user to purchase the target apparatus.

The method 200 calculates the current consumption of the target apparatus according to the usage information of the target apparatus, which is more accurate than the experience of the users. Moreover, the method 200 may timely alert the users when the current consumption reaches the preset consumption alerting threshold, so as to enable the target apparatus to be maintained in proper operating condition. Furthermore, when the current consumption of the target apparatus reaches the replacement warning consumption, the method 200 may display the purchase option shortcut allowing the users to purchase the target apparatus quickly. Therefore, the method 200 may improve the user experience.

Figure 7:
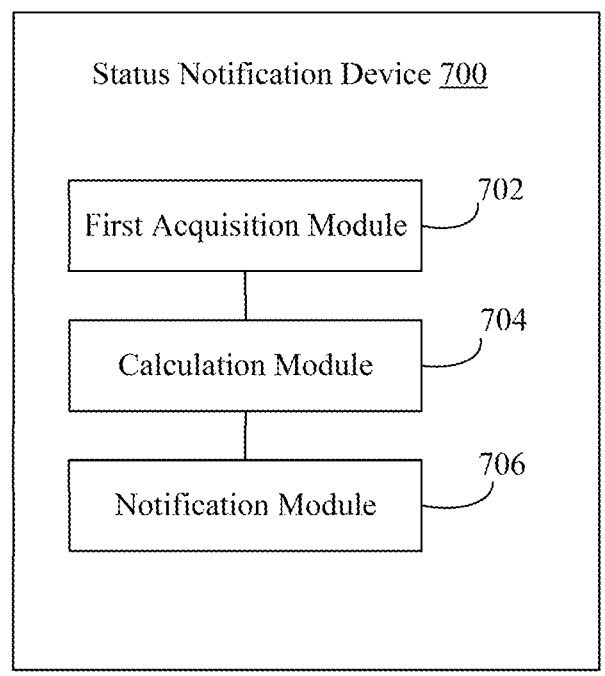
FIG. 7 is a block diagram of a device for providing status notification, according to an exemplary embodiment.

FIG. 7 is a block diagram illustrating a device 700 for providing status notification of a target apparatus, according to an exemplary embodiment. Referring to FIG. 7, the device 700 includes a first acquisition module 702, a calculation module 704, and a notification module 706.

The first acquisition module 702 is configured to acquire usage information of a target apparatus, including at least each usage duration of the target apparatus. The calculation module 704 is configured to calculate current consumption of the target apparatus according to the usages information of the target apparatus. The notification module 703 is configured to generate an alert regarding a current status of the target apparatus after the current consumption of the target apparatus reaches a preset consumption alerting threshold.

In exemplary embodiments, the first acquisition module 702 may be configured to activate Bluetooth function of the device 700 and acquire the usage information of the target apparatus through a Bluetooth connection. The first acquisition module 702 may also be configured to activate a NFC function of the device 700 and acquire the usage information of the target apparatus through a NFC data channel. The first acquisition module 702 may further be configured to receive the usage information of the target apparatus forwarded by a router.

In one exemplary embodiment, the notification module 706 may be configured to display a data display page. The data display page may be configured to display the current consumption of the target apparatus. The notification module 706 may also be configured to generate an alert regarding the current status of the target apparatus after the current consumption displayed on the data display page reaches the preset consumption alerting threshold.

In some exemplary embodiments, the notification module 706 may be configured to generate the alert regarding the current status of the target apparatus in various manners. For example, the notification module 706 may be configured to generate an alert regarding the current status of the target apparatus in a first alerting manner, after the current consumption of the target apparatus reaches a first consumption alerting threshold. The notification module 706 may also be configured to generate the alert in a second alerting manner, after the current consumption reaches a second consumption alerting threshold. The notification module 706 may further be configured to generate the alert in a third alerting manner, after the consumption reaches a third consumption alerting threshold. Here, the first consumption alerting threshold is lower than the second consumption alerting threshold, and the second consumption alerting threshold is lower than the third consumption alerting threshold.

In one exemplary embodiment, the calculation module 704 may be configured to acquire each usage duration of the target apparatus. The calculation module 704 may also be configured to obtain a theoretical cumulative usage duration of the target apparatus by adding the each usage duration of the target apparatus. The calculation module 704 may further be configured to calculate the current consumption of the target apparatus according to the theoretical cumulative usage duration and a lifespan of the target apparatus.

In one exemplary embodiment, the device 700 may further include a second acquisition module (not shown in FIG. 7) configured to acquire environmental data of the target apparatus corresponding to each usage duration. The calculation module 704 may be configured to determine an environmentally weighted value for each usage duration, according to the environmental data corresponding to each usage duration. The calculation module 704 may also be configured to obtain an actual cumulative usage duration of the target apparatus by adding products of each usage duration and the corresponding environmentally weighted value. The calculation module 704 may further configured to calculate the current consumption of the target apparatus according to the actual cumulative usage duration and a lifespan of the target apparatus.

In one exemplary embodiment, the device 700 may further include a third acquisition module (not shown) configured to acquire an operating level of the target apparatus corresponding to each usage duration. The calculation module 704 may be configured to determine a level weighted value for each usage duration, according to the operating level corresponding to each usage duration. The calculation module 704 may also be configured to obtain an actual cumulative usage duration of the target apparatus by adding products of each usage duration and the corresponding environmentally weighted value. The calculation module 704 may further be configured to calculate the current consumption of the target apparatus according to the actual cumulative usage duration and a lifespan of the target apparatus.

In one exemplary embodiment, the device 700 may further include a fourth acquisition module (not shown) configured to acquire an operating area of the target apparatus. The calculations module 704 may be configured to determine an area weighted value for each usage duration. The calculation module 704 may also be configured to obtain an actual cumulative usage duration of the target apparatus by adding products of each usage duration and the corresponding area weighted values. The calculation module 704 may further be configured to calculate the current consumption of the target apparatus according to the actual cumulative usage duration and a lifespan of the target apparatus.

In one exemplary embodiment, the device 700 may further include a fifth acquisition module, a determination module, and a display module (not shown). The fifth acquisition module is configured to acquire purchase history of a user account. The determination module is configured to determine a replacement warning consumption of the target apparatus, according to the current consumption of the target apparatus, the usage information of the target apparatus, and the purchase history of the user account. The display module is configured to display a purchase option shortcut after the current consumption of the target apparatus reaches the replacement warning consumption. The purchase option shortcut is configured to direct the user to a purchase link of the target apparatus.

In one exemplary embodiment, the determination module may be further configured to determine remaining useful days of the target apparatus according to the usage information and the current consumption of the target apparatus. The determination module may also be configured to determine a delivery time according to a seller's warehouse address and the user's shipping address. Both addresses may be obtained from the purchase history of the user account. The determination module may further be configured to determine the replacement warning consumption of the target apparatus, according to the remaining useful days and the delivery time.

Figure 8:
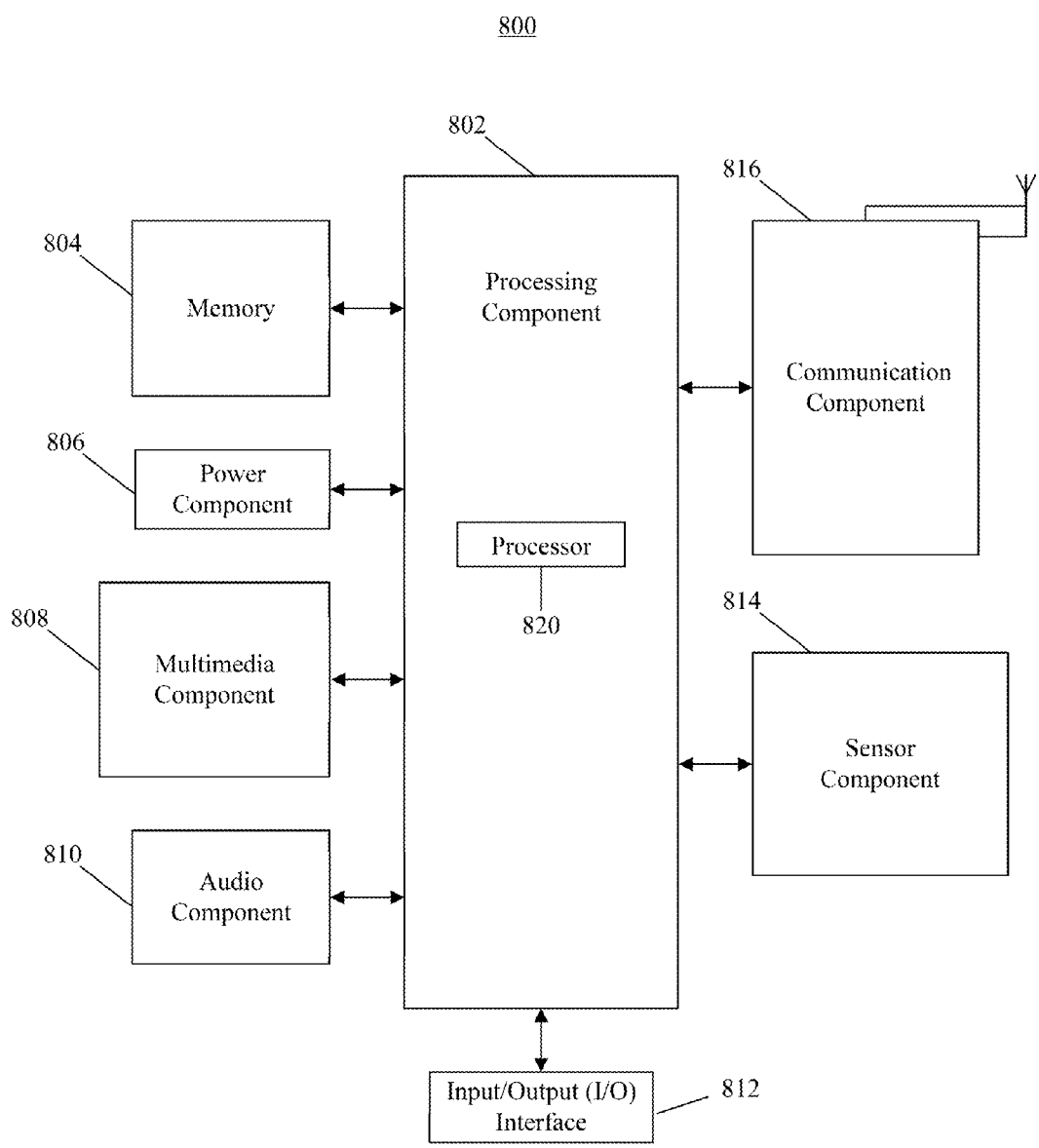
FIG. 8 is a block diagram of a device for providing status notification, according to an exemplary embodiment.

FIG. 8 is a block diagram of a device 800 for providing status notification of a target apparatus, according to an exemplary embodiment. For example, the device 800 may be a mobile phone, a computer, a digital broadcast terminal, a messaging device, a gaming console, a tablet, a medical device, exercise equipment, a personal digital assistant, and the like.

Referring to FIG. 8, the device 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the device 800, such as the operations associated with display, telephone calls, data communications, camera operations, and recording operations. The processing component 802 may include one or more processors 820 to execute instructions to perform all or part of the steps in the above described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the device 800. Examples of such data include instructions for any applications or methods operated on the device 800, contact data, phonebook data, messages, pictures, video, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the device 800. The power component 806 may include a power management system, one or more power sources, and any other components associated with the generation, management, and distribution of power in the device 800.

The multimedia component 808 includes a screen providing an output interface between the device 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front camera and/or a rear camera. The front camera and the rear camera may receive external multimedia data while the device 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone configured to receive an external audio signal when the device 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the device 800. For instance, the sensor component 814 may detect an open/closed status of the device 800, relative positioning of components, e.g., the display and the keypad, of the device 800, a change in position of the device 800 or a component of the device 800, a presence or absence of user contact with the device 800, an orientation or an acceleration/deceleration of the device 800, and a change in temperature of the device 800. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate communication, wired or wirelessly, between the device 800 and other devices. The device 800 can access a wireless network based on a communication standard, such as WiFi, 2G, 3G, 4G, or a combination thereof. In one exemplary embodiment, the communication component 816 receives a broadcast signal or broadcast associated information from an external broadcast management system via a broadcast channel. In one exemplary embodiment, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 804, executable by the processor 820 in the device 800, for performing the above-described methods. For example, the non-transitory computer-readable storage medium may be a read-only memory (ROM), a random access memory (RAM), a CD-ROM, a magnetic tape, a floppy disc, an optical data storage device, and the like.

One of ordinary skill in the art will understand that the above-described modules can each be implemented by hardware, or software, or a combination of hardware and software. One of ordinary skill in the art will also understand that multiple ones of the above-described modules may be combined as one module, and each of the above-described modules may be further divided into a plurality of sub-modules.

Other embodiments of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A status notification method for use in a terminal, comprising:
  acquiring usage information of a target apparatus, the usage information including at least each usage duration of the target apparatus;
  calculating current consumption of the target apparatus according to the usage information of the target apparatus;
  generating an alert regarding a current status of the target apparatus after the current consumption of the target apparatus reaches a preset consumption alerting threshold;
  acquiring purchase history of a user account;
  determining a replacement warning consumption of the target apparatus, according to the current consumption of the target apparatus, the usage information of the target apparatus, and the purchase history of the user account; and
  displaying a purchase option for the target apparatus, after the current consumption of the target apparatus reaches the replacement warning consumption.

2. The method of claim 1, wherein the acquiring of the usage information of the target apparatus comprises at least one of:
  activating a Bluetooth function of the terminal and acquiring the usage information of the target apparatus through a Bluetooth connection;
  activating a Near Field Communication (NFC) function of the terminal and acquiring the usage information of the target apparatus through a NFC data channel; or
  receiving the usage information of the target apparatus forwarded by a router.

3. The method of claim 1, wherein the generating of the alert regarding the current status of the target apparatus after the current consumption of the target apparatus reaches the preset consumption alerting threshold further comprises:
  displaying a data display page configured to display the current consumption of the target apparatus; and
  generating the alert regarding the current status of the target apparatus after the current consumption displayed on the data display page reaches the preset consumption alerting threshold.

4. The method of claim 3, wherein the generating of the alert regarding the current status of the target apparatus further comprises:
  generating the alert regarding the current status of the target apparatus in a first alerting manner, after the current consumption of the target apparatus reaches a first consumption alerting threshold;

generating the alert regarding the current status of the target apparatus in a second alerting manner, after the current consumption of the target apparatus reaches a second consumption alerting threshold; and generating the alert regarding the current status of the target apparatus in a third alerting manner, after the current consumption reaches a third consumption alerting threshold;

wherein the first consumption alerting threshold is lower than the second consumption alerting threshold, and the second consumption alerting threshold is lower than the third consumption alerting threshold.

5. The method of claim 1, wherein the calculating of the current consumption of the target apparatus according to the usage information of the target apparatus comprises:

acquiring each usage duration of the target apparatus;

obtaining a theoretical cumulative usage duration of the target apparatus by adding each usage duration of the target apparatus; and calculating the current consumption of the target apparatus according to the theoretical cumulative usage duration of the target apparatus and a lifespan of the target apparatus.

6. The method of claim 1, further comprising:

acquiring environmental data of the target apparatus;

wherein the calculating of the current consumption of the target apparatus according to the usage information of the target apparatus comprises:

determining an environmentally weighted value for each usage duration, according to the environmental data corresponding to the usage duration;

obtaining an actual cumulative usage duration of the target apparatus by adding products of each usage duration and the corresponding environmentally weighted value; and calculating the current consumption of the target apparatus according to the actual cumulative usage duration of the target apparatus and a lifespan of the target apparatus.

7. The method of claim 1, further comprising:

acquiring one or more operating levels of the target apparatus;

wherein the calculating of the current consumption of the target apparatus according to the usage information of the target apparatus comprises:

determining a level weighted value for each usage duration, according to the operating level of the target apparatus corresponding to the usage duration;

obtaining an actual cumulative usage duration of the target apparatus by adding products of each usage duration and the corresponding level weighted value; and calculating the current consumption of the target apparatus according to the actual cumulative usage duration of the target apparatus and a lifespan of the target apparatus.

8. The method of claim 1, further comprising:

acquiring one or more operating areas of the target apparatus;

wherein the calculating of the current consumption of the target apparatus according to the usage information of the target apparatus comprises:

determining an area weighted value for each usage duration, according to the operating area of the target apparatus corresponding to the usage duration;

obtaining an actual cumulative usage duration of the target apparatus by adding products of each usage duration and the corresponding area weighted value; and calculating the current consumption of the target apparatus according to the actual cumulative usage duration of the target apparatus and a lifespan of the target apparatus.

9. The method of claim 1, wherein the determining of the replacement warning consumption of the target apparatus, according to the current consumption of the target apparatus, the usage information of the target apparatus, and the purchase history of the user account, further comprises:

determining a remaining use time period of the target apparatus according to the usage information of the target apparatus and the current consumption of the target apparatus;

determining a delivery time for the target apparatus according to a first address associated with a seller of the target apparatus and a second address associated with a user of the target apparatus, the first address and the second address being obtained from the purchase history of the user account; and determining the replacement warning consumption of the target apparatus, according to the remaining use time period and the delivery time.

10. A device for providing status notification, comprising:

a processor; and a memory for storing instructions executable by the processor;

wherein the processor is configured to perform:

acquiring usage information of a target apparatus, the usage information comprising at least each usage duration of the target apparatus;

calculating current consumption of the target apparatus according to the usage information of the target apparatus;

generating an alert regarding a current status of the target apparatus after the current consumption of the target apparatus reaches a preset consumption alerting threshold;

acquiring purchase history of a user account;

determining a replacement warning consumption of the target apparatus, according to the current consumption of the target apparatus, the usage information of the target apparatus, and the purchase history of the user account; and displaying a purchase option for the target apparatus, after the current consumption of the target apparatus reaches the replacement warning consumption.

11. The device of claim 10, wherein the processor is further configured to perform:

activating a Bluetooth function of the device and acquiring the usage information of the target apparatus through a Bluetooth connection;

activating a NFC function of the device and acquiring the usage information of the target apparatus through a NFC data channel; or receiving the usage information of the target apparatus forwarded by a router.

12. The device of claim 10, wherein the processor is further configured to perform:

displaying a data display page configured to display the current consumption of the target apparatus; and generating the alert regarding the current status of the target apparatus after the current consumption displayed on the data display page reaches the preset consumption alerting threshold.

13. The device of claim 12, wherein the processor is further configured to perform:
   generating the alert regarding the current status of the target apparatus in a first alerting manner, after the current consumption of the target apparatus reaches a first consumption alerting threshold;
   generating the alert regarding the current status of the target apparatus in a second alerting manner, after the current consumption of the target apparatus reaches a second consumption alerting threshold; and
   generating the alert regarding the current status of the target apparatus in a third alerting manner, after the current consumption of the target apparatus reaches a third consumption alerting threshold;
   wherein the first consumption alerting threshold is lower than the second consumption alerting threshold, and the second consumption alerting threshold is lower than the third consumption alerting threshold.

14. The device of claim 10, wherein the processor is further configured to perform:
   acquiring each usage duration of the target apparatus;
   obtaining a theoretical cumulative usage duration of the target apparatus by adding each usage duration of the target apparatus; and
   calculating the current consumption of the target apparatus according to the theoretical cumulative usage duration of the target apparatus and a lifespan of the target apparatus.

15. The device of claim 10, wherein the processor is further configured to perform:
   acquiring environmental data of the target apparatus;
   determining an environmentally weighted value for each usage duration, according to the environmental data corresponding to the usage duration;
   obtaining an actual cumulative usage duration of the target apparatus by adding products of each usage duration and the corresponding environmentally weighted value; and
   calculating the current consumption of the target apparatus according to the actual cumulative usage duration of the target apparatus and a lifespan of the target apparatus.

16. The device of claim 10, wherein the processor is further configured to perform:
   acquiring one or more operating levels of the target apparatus;
   determining a level weighted value for each usage duration, according to the operating level of the target apparatus corresponding to each usage duration;
   obtaining an actual cumulative usage duration of the target apparatus by adding products of each usage duration and the corresponding level weighted value; and
   calculating the current consumption of the target apparatus according to the actual cumulative usage duration of the target apparatus and a lifespan of the target apparatus.

17. The device of claim 10, wherein the processor is further configured to perform:
   acquiring one or more operating areas of the target apparatus;
   determining an area weighted value for each usage duration, according to the operating area of the target apparatus corresponding to the usage duration;
   obtaining an actual cumulative usage duration of the target apparatus by adding products of the each usage duration and the corresponding area weighted value; and
   calculating the current consumption of the target apparatus according to the actual cumulative usage duration of the target apparatus and the lifespan of the target apparatus.

18. The device of claim 10, wherein the processor is further configured to perform:
   determining a remaining use time period of the target apparatus according to the usage information of the target apparatus and the current consumption of the target apparatus;
   determining a delivery time for the target apparatus according to a first address associated with a seller of the target apparatus and a second address associated with a user of the target apparatus, the first address and the second address being obtained from the purchase history of the user account; and
   determining the replacement warning consumption of the target apparatus, according to the remaining use time period and the delivery time.

* * * * *